March 12, 1957 A. J. HATCH 2,785,333
ARC LAMP
Filed June 15, 1955 6 Sheets-Sheet 1
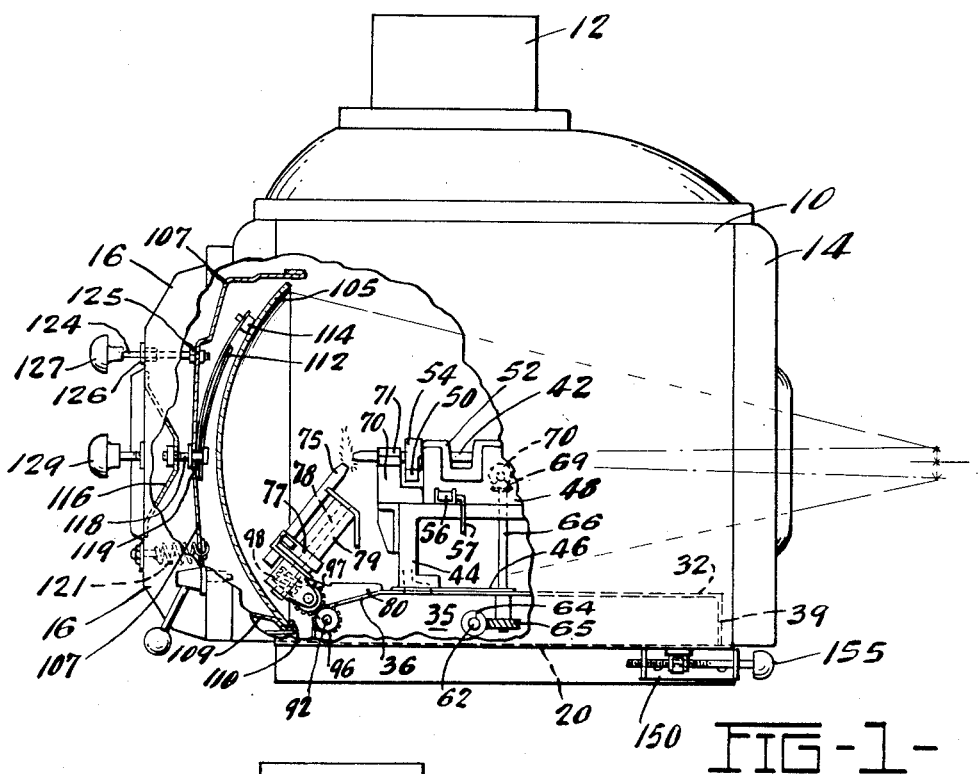
FIG-1-
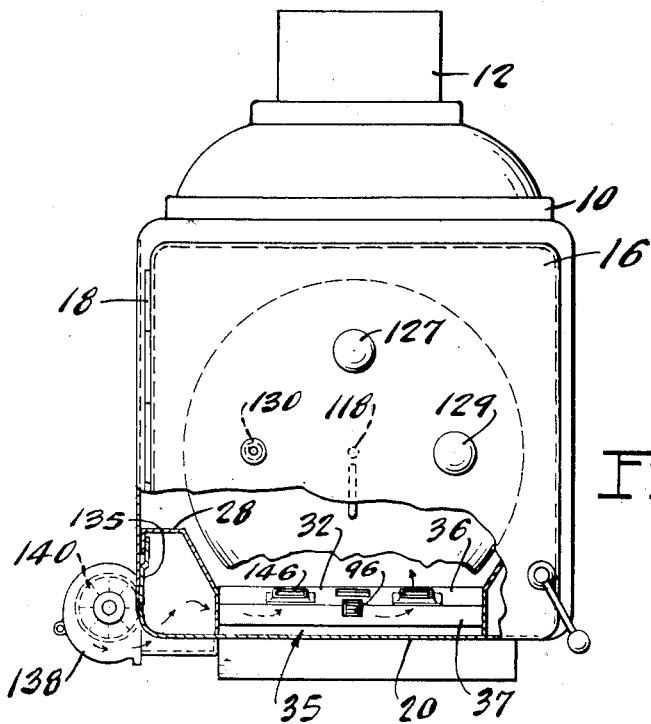
FIG-2-
INVENTOR:
ARTHUR J. HATCH.
BY
Harry O. Ernsberger
ATTY.

March 12, 1957 A. J. HATCH 2,785,333
ARC LAMP
Filed June 15, 1955 6 Sheets-Sheet 2
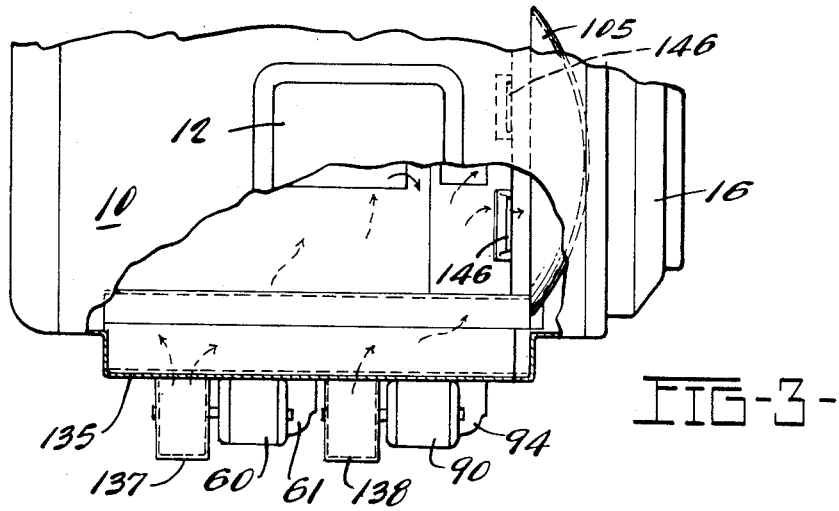
FIG-3-
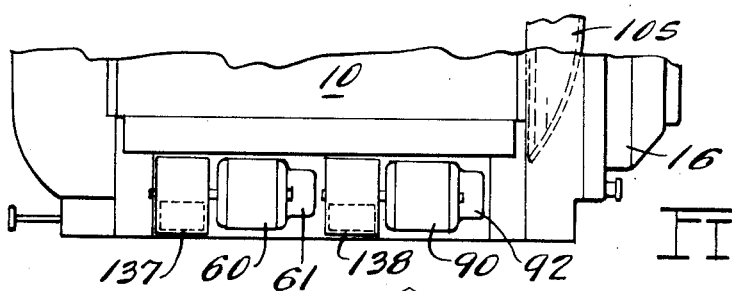
FIG-4-
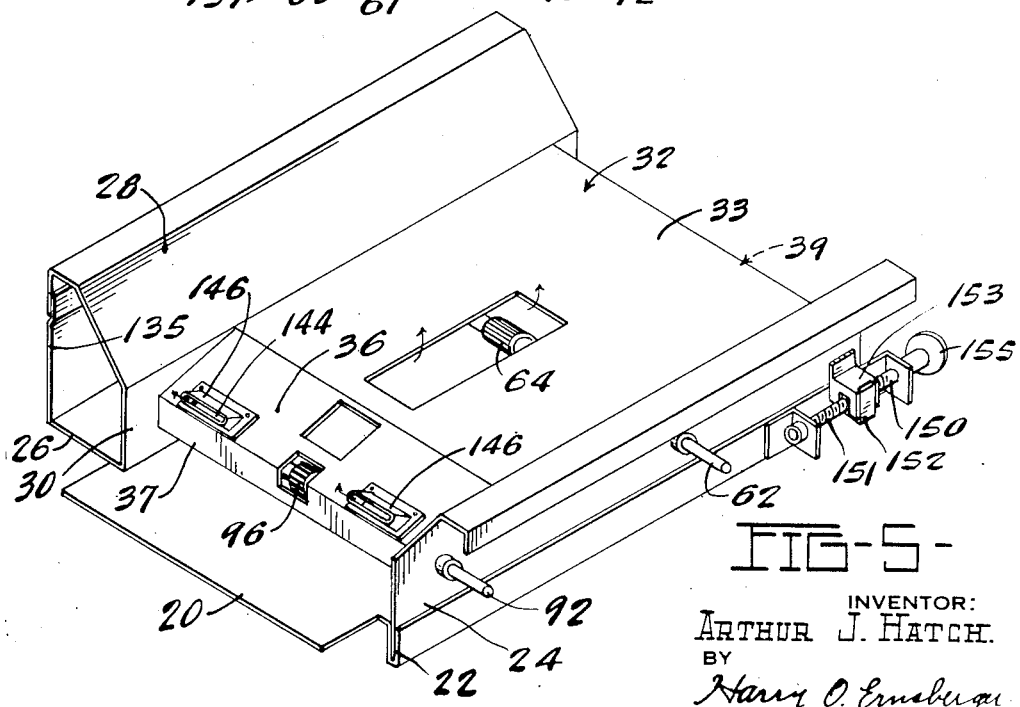
FIG-5-
INVENTOR:
ARTHUR J. HATCH.
BY
Harry O. Ernsberger
ATT'Y.

March 12, 1957
A. J. HATCH
2,785,333
ARC LAMP
Filed June 15, 1955
6 Sheets-Sheet 3
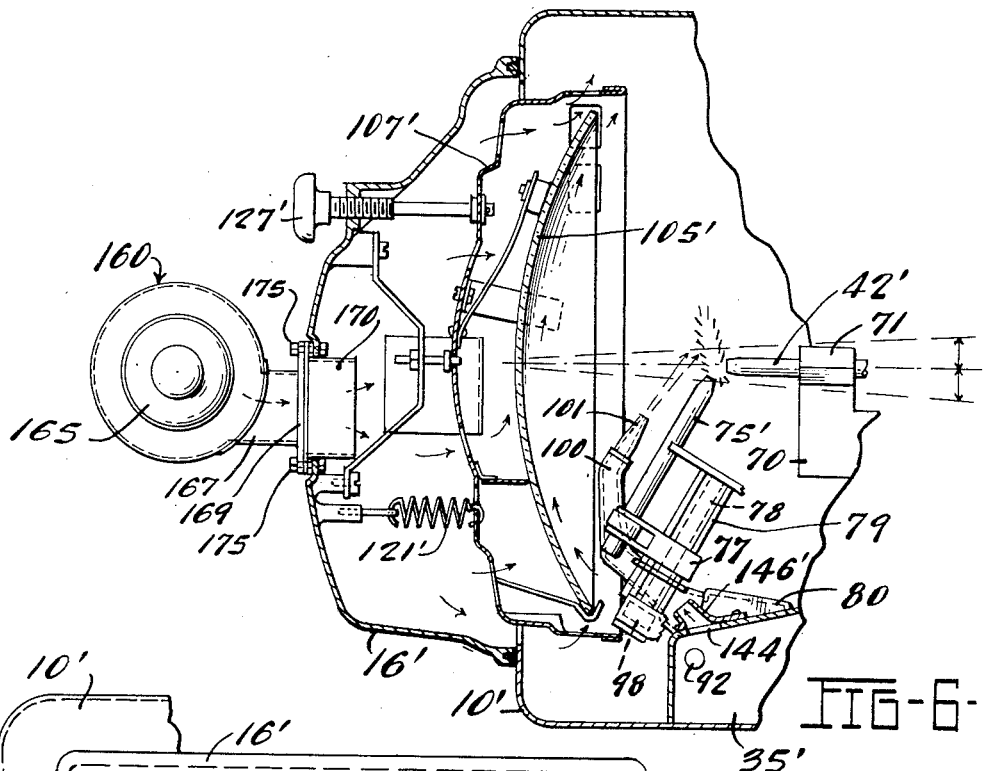
FIG-6-
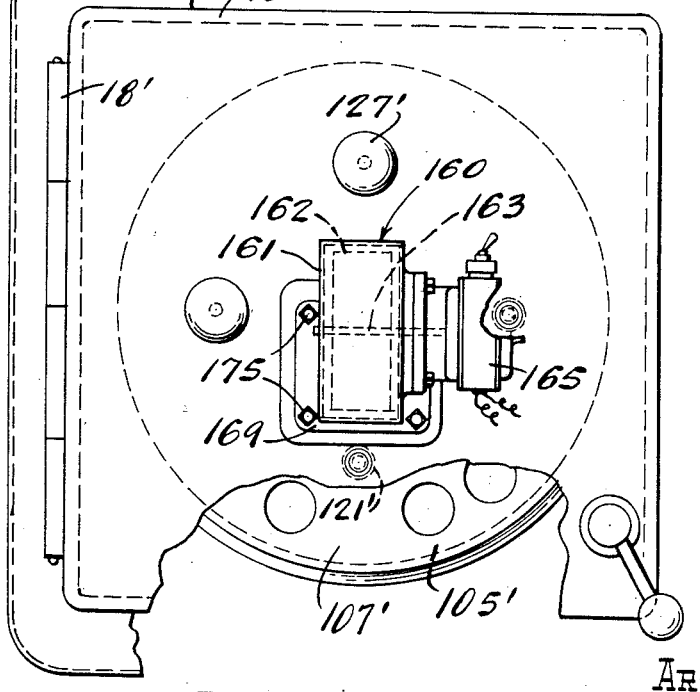
FIG-7-
INVENTOR:
ARTHUR J. HATCH.
BY
Harry O. Ernsberger
ATTY.

March 12, 1957     A. J. HATCH     2,785,333
ARC LAMP
Filed June 15, 1955     6 Sheets-Sheet 4
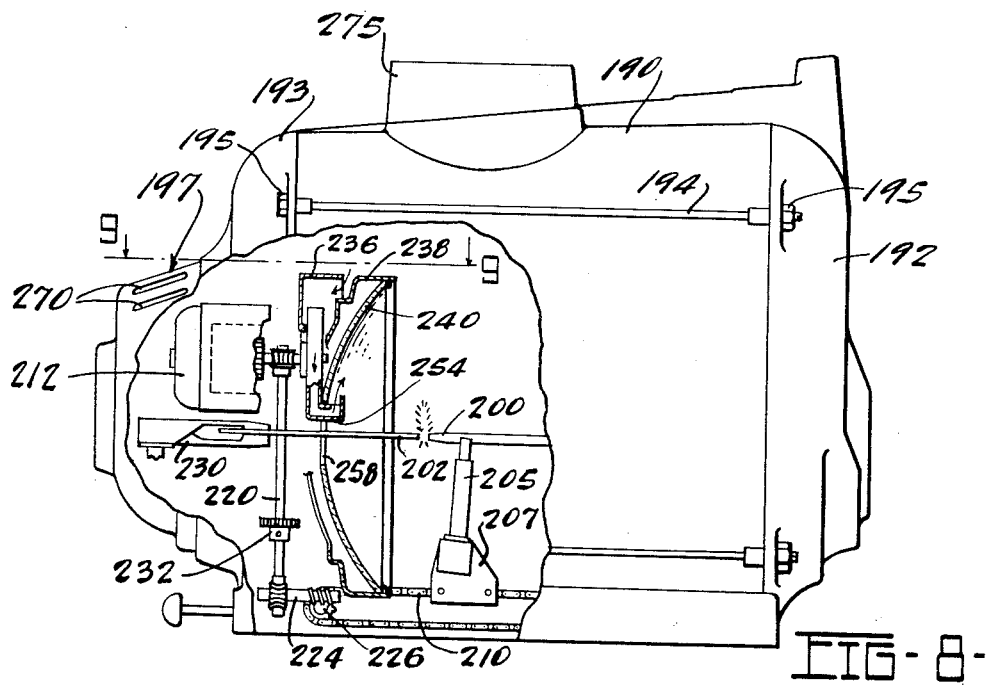
FIG-8-
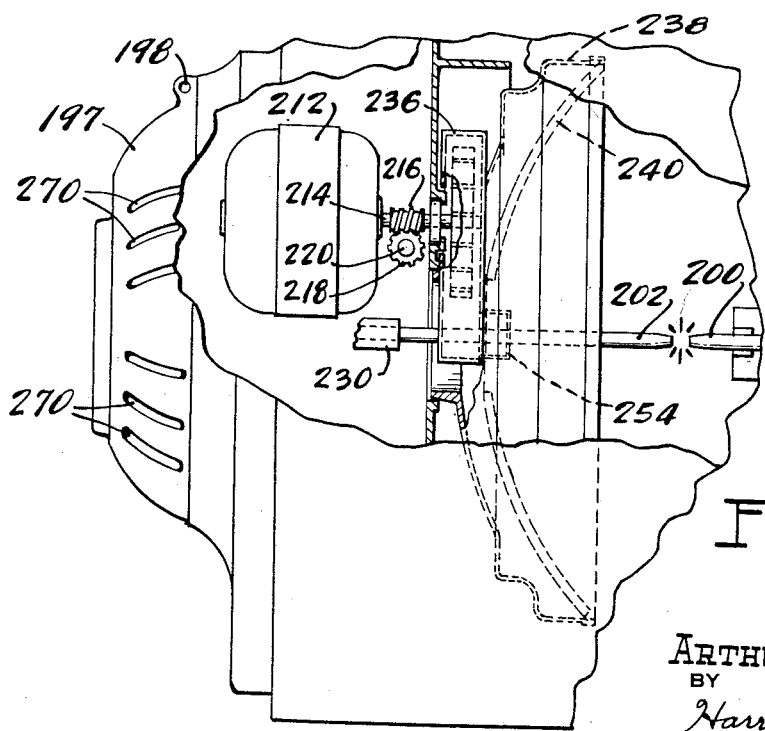
FIG-9-
INVENTOR:
ARTHUR J. HATCH.
BY
Harry O. Ernsberger
ATTY.

March 12, 1957     A. J. HATCH     2,785,333
ARC LAMP
Filed June 15, 1955     6 Sheets-Sheet 5
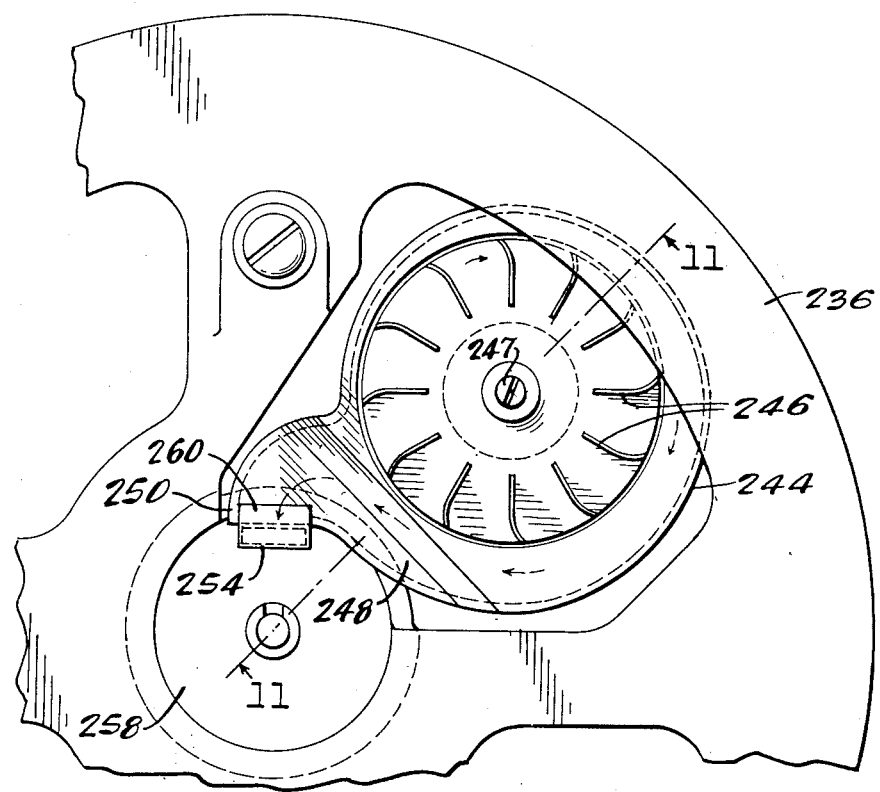
FIG-10-
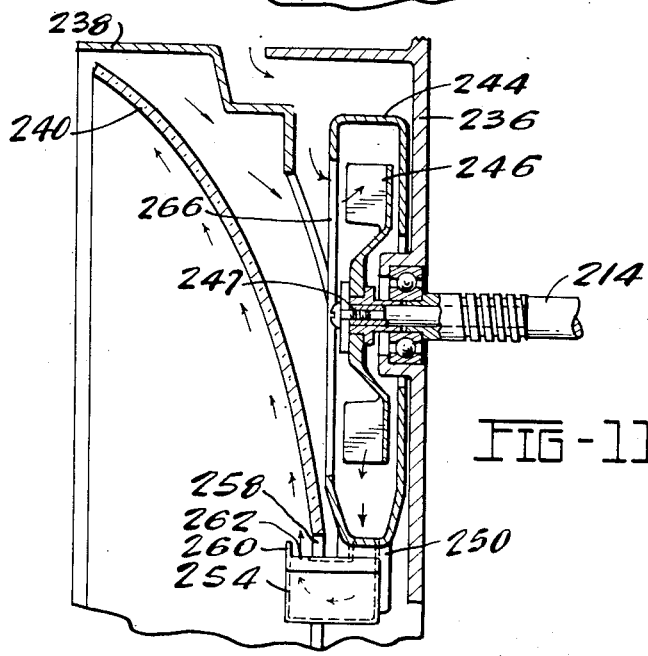
FIG-11-
INVENTOR:
ARTHUR J. HATCH.
BY
Harry A. Ernsberger
ATTY.

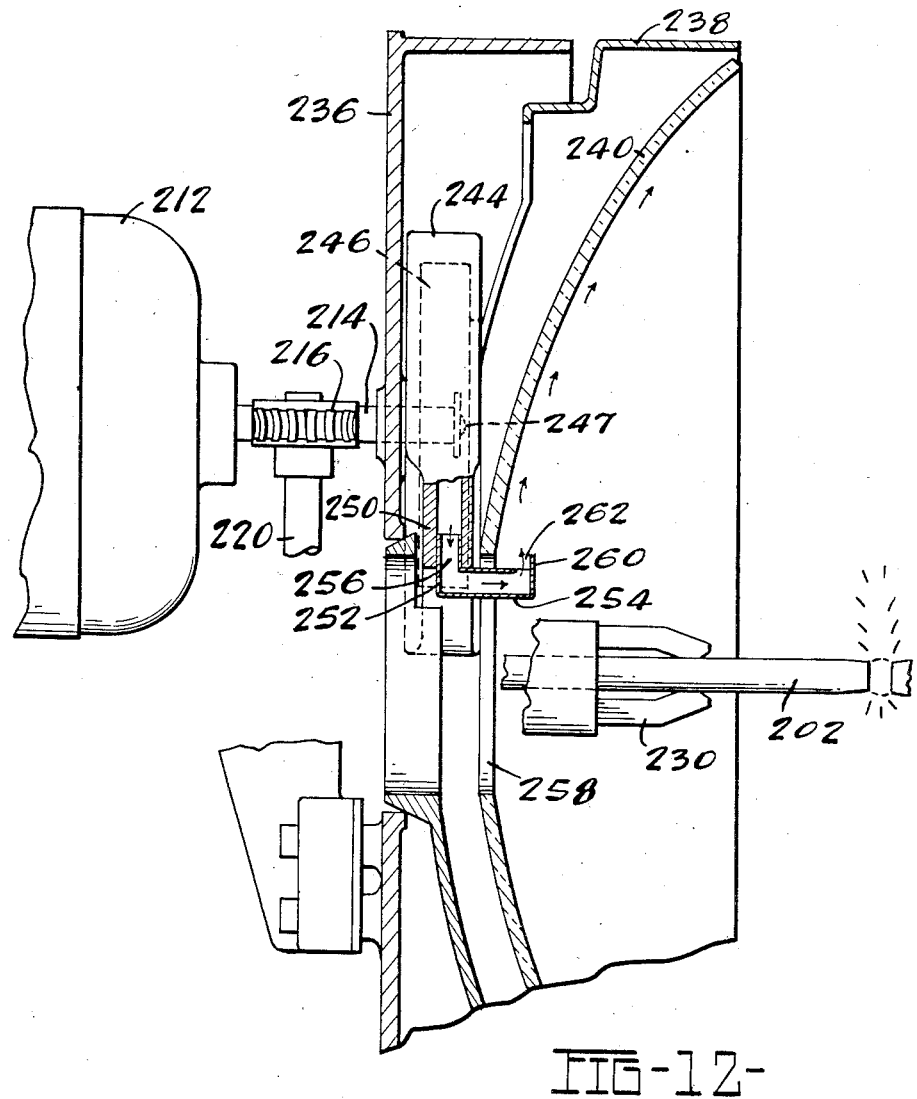

United States Patent Office 2,785,333
Patented Mar. 12, 1957

2,785,333
ARC LAMP

Arthur J. Hatch, Toledo, Ohio, assignor to The Strong Electric Corporation, Toledo, Ohio, a corporation of Delaware Application June 15, 1955, Serial No. 515,745

12 Claims. (Cl. 314—26)

This invention relates to arc lamps and more especially to arc lamps for use in cinematography, television casting and theater stage illumination including motion picture projection.

Arc lamps of the character adapted for the above mentioned uses and purposes require comparatively high current consumption in order to secure the necessary brilliancy of illumination and a tremendous amount of heat energy is therefore generated by the arc. Projection lamps are provided with reflectors made of metal or glass and the reflector must necessarily be positioned in juxtaposed relation to the arc. Due to the proximity of the reflector to the arc, the ash and soot from the oxidized carbon or other materials from which the arc electrodes are formed tend to accumulate upon the reflector surface. The deposit of ash and soot on the reflector impairs and reduces the intensity of the reflected light beam.

Various endeavors have been pursued to ventilate the lamp housing to eradicate or minimize these difficulties, but ventilating arrangements heretofore utilized have had adverse effects on the flame of the arc, rendering the arc unstable and impairing the constancy characteristics of the light beam.

This invention embraces a means and method of circulating a temperature reducing medium through the lamp housing in a manner to exhaust from the housing oxidized material or ash resulting from the operation of the arc so as to secure more efficient illumination from the arc.

An object of the invention resides in circulating a cooling fluid, such as air, adjacent the reflector for establishing an air stream engaging the reflector for reducing the temperature of the zone ambient the reflector and to direct the air stream through the lamp housing in a manner to avoid interference or impairment of the illuminating characteristics of the arc.

Another object of the invention is the provision of an arrangement for directing or circulating a stream of air or other gas adjacent the reflecting surface of the reflector in order to effectively purge the reflector surface of particles of oxidized material or products of combustion resulting from oxidation of the electrodes in producing the arc, the air or gas stream being controlled so as not to impair or inhibit the proper functioning and operation of the arc and reflector to provide constant and efficient illumination.

Another object of the invention resides in a method of avoiding the deposition of products of combustion from an arc upon a reflector or other light controlling means through the utilization of a stream of air or other gas flowing adjacent the surface of a reflector in a manner to entrain, convey and remove oxidized particles or products of combustion from the zone adjacent the reflector and reduce the temperature ambient the reflector without adversely affecting the position of the arc flame.

Another object of the invention resides in associating an air stream producing means with a lamp housing or other element of the lamp structure so as not to impair the operation of the various components of the lamp structure or interfere with ready access to the interior of the lamp housing for servicing purposes.

Still a further object of the invention is the establishment of a zone of air under pressure adjacent the reflector so as to effect a circulation of atmospheric air adjacent the reflector for cooling the reflector and conveying heated air out of the lamp housing.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of an arc lamp structure embodying a form of the invention, certain parts being shown in section;

Figure 2 is a rear view of the arrangement shown in Figure 1;

Figure 3 is a top plan view of a portion of the construction shown in Figure 1, certain parts being shown in section;

Figure 4 is an elevational view from the opposite side of the construction shown in Figure 1;

Figure 5 is an isometric view of a base portion of the lamp structure showing a pressure air reservoir for supplying air streams for circulation in a zone adjacent the lamp reflector;

Figure 6 is a vertical longitudinal sectional view through the rear portion of an arc lamp construction similar to Figure 1 showing a form of means for directing an air current or stream adjacent the reflector;

Figure 7 is a rear view of the construction shown in Figure 6;

Figure 8 is a side elevational view of a modified form of arc lamp construction illustrating a fluid or air circulating means of the invention;

Figure 9 is a fragmentary sectional view taken substantially on the line 9—9 of Figure 8;

Figure 10 is a fragmentary detail view illustrating the air circulating means shown in Figures 8 and 9;

Figure 11 is a sectional view taken substantially on the line 11—11 of Figure 10, and Figure 12 is an enlarged detail sectional view illustrating the air circulating means shown in Figures 8 through 11.

While the invention has been illustrated in arc lamps especially adapted for cinematography, television casting and illumination for theatrical purposes, it is to be understood that the invention may be utilized in other forms of lamp construction such as search lights and the like.

With particular reference to Figures 1 through 5, there is illustrated an arc lamp construction of a type embodying automatic feeding means for the electrodes or carbons adapted to form the arc. The construction is inclusive of a housing 10 embodying a chimney or vent 12 for conveying away or exhausting the gases or products of combustion resulting from oxidation of the electrodes. The housing is equipped with a frontal plate or member 14 provided with an opening through which is projected the light produced by the arc. The opposite end of the housing 10 is equipped with a member or door 16 which is hinged as at 18 or otherwise moveably supported upon the housing 10.

The housing includes a base plate 20, a lateral edge of which is formed with a U-shaped portion 22, the U-shaped portion providing a guide for an upwardly extending plate or member 24. The opposite edge portion of the base member 20 provides a support for a member 28 formed of the sheet metal to tubular configuration as shown in Figure 5.

The member 28 is formed with an inner vertical wall 30 which is substantially parallel with the wall or plate 24. Disposed between the walls 24 and 30 is a member 32 which has a planar portion 33 provided with depending flanges (not shown) which are welded to the walls 24 and 30. The members 20 and 32 with the walls 24 and 30 form a rectangularly shaped chamber or air reservoir 35. The member 32 is formed with a downwardly inclined portion 36 which terminates in vertically depending portion 37 forming one end wall of the reservoir, the opposite end of member 32 having a vertically disposed portion 39 forming the other end wall of the reservoir. The tubular member 28 encloses an energy-responsive means (not shown) for automatically controlling the operation of the electrode feeding means to maintain the proper position of the arc.

The assembly, including the members 28 and 32 and plate 24 in parts associated therewith, is slidable longitudinally of the base 20 and lamp housing to adjust the position of the electrodes with respect to the reflector, the adjusting means being hereinafter described. The edge zones of the depending portions 37 and 39 are provided with strips of asbestos (not shown) engaging the upper surface of the base plate 20 to establish a seal between these parts. Air is delivered into the reservoir or chamber 35 by means hereinafter described.

The planar portion 33 of member 32 forms or provides a support for the head or means carrying the positive electrode 42. The said means is inclusive of a pedestal 44 preferably in the form of a hollow casting mounted upon a plate 46, the latter being secured to the planar portion or platform 33 of member 32. The member 44 supports an electrode carrying head 48 upon which is journaled a pair of shafts respectively supporting electrode feed rollers 50, one of which is shown in Figure 1, for driving the positive electrode or carbon 42.

Journaled upon a shaft carried by the head 48 is a bracket 52 upon which is journaled a shaft (not shown) supporting a third roller 54 which is adapted to engage the electrode 42. The bracket 52 has a depending portion engageable with a cam 56 mounted upon an arm 57 journaled upon projections extending laterally from the head 48. By manipulating the arm 57, the cam 56 moves the bracket 52 about its supporting shaft to elevate the drive roller 54 out of engagement with the electrode 42 in order to facilitate adjustment or replacement. The bracket 52 is normally biased by a spring (not shown) in a direction to engage the roller 54 with the electrode 42 whereby the electrode is firmly gripped by the three drive rollers.

This construction of electrode supporting means is disclosed in the patent to W. F. Witte No. 2,681,983, granted June 22, 1954.

A suitable driving means is provided for continuously advancing the positive electrode. The arrangement includes a motor 60, shown in Figure 3, connected by suitable gearing contained within a housing 61 adapted to drive a transversely disposed shaft 62, shown in Figure 5. The shaft 62 is provided with a gear 64 meshing with a gear 65 carried upon the lower end of a shaft 66 journaled in the member 44. The electrode driving rollers 50 are driven from shaft 66 through mitre gears 69 and 70 and spur gears (not shown).

The chamber 35 is adapted to contain air above atmospheric pressure and air is delivered from the chamber 35 upwardly through the hollow casting or member 44 to cool the head 48 and mechanism associated therewith. A suitable means 70 supported by a member 44 is arranged to engage the positive electrode or carbon 42 and a clamp 71 cooperates with the means 70 in guiding the positive carbon or electrode 42 and provides a current conducting means for supplying electrical energy to the electrode.

The axis of the driving rollers 50 and 54 are angularly arranged or slightly askew relative to the longitudinal axis of the electrode 42 so that operation of the driving rollers rotates the electrode 42 and simultaneously advances the electrode in a direction toward the arc in order to compensate for the burning away or oxidation of the electrode.

The negative electrode 75 is mounted upon a suitable carriage 77 which is threaded on a threaded shaft 78 journaled in a bracket 79 mounted upon a hollow fitting 80 secured to the angular portion 36 of member 32.

The driving means for the negative electrode 75 includes a motor 90 which drives a transversely extending shaft 92 through suitable gearing contained within a casing 94 shown in Figure 3. The shaft 92 is equipped with a pinion 96 which drives a gear 97 journaled upon the bracket 79. The gear 97 drives a gear 98 secured on the threaded shaft 78. Rotation of the shaft 92 by the motor 90 is transmitted through the gears 96, 97 and 98 causing rotation of the threaded shaft 78 with consequent longitudinal movement of the negative electrode 75 in the direction of the arc.

The driving ratios for the positive and negative electrodes are different, the positive electrode 42 being advanced at a greater rate than a negative electrode 75 for the reason that the positive electrode burns away or is consumed at a greater rate than the negative electrode.

Secured to the fitting 80 is a tubular member 100 having a nozzle portion 101 through which a stream of air is discharged in substantial parallelism with the negative electrode 75. The hollow interior is supplied with air from the chamber 35 through an opening in the portion 36, the air being discharged from the nozzle 101. The function of the air stream from nozzle 101 is to bend or redirect the flame of the arc in a vertical direction to further remove the heat of the flame from the reflector and stabilize the arc.

In the lamp construction illustrated in Figures 1 and 2, the reflector 105 is supported by means carried by the hinged door 16. The reflector 105 is preferably made of glass and is preferably of ellipsoidal shape to properly reflect or redirect the light from the arc forwardly of the lamp housing through a suitable aperture formed in the frontal plate 14.

The projected or reflected beam of light from the lamp may be utilized with a cinema projector or for other illumination purposes. It is to be understood that the reflector 105 may be formed of metal if desired.

The reflector 105 is supported in a skeleton frame 107 formed of sheet metal having forwardly extending arms or portions 109 (one of which is shown in Figure 1) formed with hook-like portions 110 engaging the edge zone or periphery of the reflector. The reflector 105 is held in engagement with the hook portions 110 by means of plate springs 112 equipped with pads 114, the latter directly engaging the rear surface of the reflector.

Secured to the inner surface of the door 16 is a bracket 116 which carries at its central zone a threaded member or bolt 118. The central zone of the frame 107 is formed with an opening 119 which receives the member or bolt 118, the bolt serving to center the frame 107 and the reflector 105 in the housing.

Means are provided for adjusting the relative position of the reflector to control the beam of light. As shown in Figure 1, a contractile spring 121 has its ends anchored respectively to the door 16 and the skeleton frame 107 at a zone beneath the bolt 118. Positioned above the bolt 118 is a manipulating means for adjusting the tilt of the reflector in a vertical direction. The adjusting means includes a threaded rod 124 having a connection as at 125 with the frame 107 which permits rotation of the rod 124 relative to the frame.

Secured to the door 16 is a bushing 126 which is interiorly threaded to accommodate the rod 124 the latter being equipped with a manipulating knob for rotating the rod. By rotating the rod 124, the reflector 105 may be tilted about the zone of connection of bolt 118 with the frame 107, the spring 121 serving to resiliently bias the reflector toward one position.

A similar arrangement is embodied in the lamp structure for adjusting the reflector construction in a horizontal direction. As shown in Figures 1 and 2, a second manipulating knob 129 is connected with the reflector supporting frame 107 by means of a rod (not shown) in the same manner that rod 124 is connected with the frame 107. A second spring 130 has one end anchored to the door 16 and the other end connected to the reflector supporting frame 107.

By rotating manipulating knob 129 and the threaded rod connected therewith, the reflector may be tilted or angularly adjusted in a horizontal direction about the axis of the supporting bolt or member 118. By manipulating knobs 127 and 129, a universal angular adjustment is provided for the reflector so that the reflected beam of light may be properly directed through the aperture in the frontal plate 14.

Each of the motors 60 and 90 is arranged to drive a means for directing air into the chamber or reservoir 35. Secured to the wall 135 of the tubular portion 28 are housings 137 and 138, each of which incloses a blower fan or impeller 140 shown in Figure 2. The impeller in the housing 137 is driven by the motor 60 and the impeller in housing 138 is driven by the motor 90. The wall 135 is formed with openings in registration with the housings 137 and 138 to admit air set in motion by the impellers 140 into the chamber 35.

Under the influence of the blowers or impellers, comparatively low air pressure is built up or established in the chamber 35, the air under pressure in the chamber 35 serving to cool the positive head construction supporting the positive electrode 42 and supplying a stream of air through the nozzle 101.

The air from the chamber or reservoir 35 is utilized for cooling the reflector and removing or preventing the deposit of ash or products of combustion on the reflector. To accomplish this result, openings 144 are provided in the portion 36 of the chamber wall. As shown in Figures 1 and 5 there is positioned adjacent each of the openings a fitting 146 through which the air from the chamber 35 is directed toward the reflector, the air flowing over the face or reflecting surface of the reflector 105 as indicated by arrows in Figure 6. The air streams flowing through the fittings 146 are spaced from the arc and do not affect or impair the characteristics of the arc. It is to be understood that the air streams moving across the surface of the reflector are of low velocity but are sufficient to remove ash from the reflector or prevent the deposition of ash or products of combustion upon the reflector. The air streams tend to entrain particles of ash and convey or exhaust them from the housing through the chimney or vent 12.

By reason of the particular positioning of the reflector 105 with respect to the arc, the upper zone of the reflector is heated to a higher temperature than the lower zone.

It is therefore desirable that the air streams be directed to engage and cool the upper zone of the reflector. Furthermore the ash or products of combustion tend to collect upon the upper zone of the reflector.

The fittings 146 are configurated to direct the air streams toward the reflector so that the air streams engage the reflecting surface at a region slightly below the horizontal midzone of the reflector so that the major cooling of the reflector takes place at the upper zone so as to reduce the temperature differential between the upper and lower zones of the reflector. By reducing the temperature of the upper zone of the reflector there is less liability for the reflector to become broken by reason of unequal expansion and contraction.

The member 32, supporting the positive and negative electrodes, is arranged for limited longitudinal adjustment relative to the lamp housing. Journaled in openings in a bracket 150 is a threaded rod 151 supporting a member 152. The member 152 is engaged by a fitting 153 carried by the side wall or plate 24 of the air reservoir construction. The rod 150 is equipped with a manipulating knob 155 for rotating the rod 150 to effect longitudinal movement of the member 152 and the member 32. By this means the position of the electrode carriers may be varied to bring the arc into proper relation to the reflector 105.

During the operation of the arc lamp shown in Figures 1 through 5, the motors 60 and 90 are continuously rotated, causing continuous operation of the impellers 140 in the housings 137 and 138 whereby a continuous supply of atmospheric air is delivered into the reservoir and chamber 35. The air under pressure in the chamber 35 flows upwardly through the hollow casting 44 to cool the positive electrode, through nozzle 101 along the negative electrode and through the fittings 146 upwardly and adjacent the frontal surface of the reflector 105. Through this arrangement the air flow adjacent the reflector cools or reduces the temperature of the reflector and removes or prevents the deposit of carbon ash or oxidized material upon the reflector surface.

Figures 6 and 7 illustrate a modified form of cooling arrangement for a reflector embodied in the lamp structure of the character shown in Figures 1 thru 5. With particular reference to Figure 6, the housing 10' is equipped with a hinged door 16'. The positive electrode 42' and the negative electrode 75' are supported within a housing 10' in the same manner as shown in Figure 1. A skeleton frame 107' is positioned within and mounted upon the door 16' in the same manner as shown in Figure 1. The reflector 105' is secured to and supported by the skeleton frame 107'.

In this form of construction, a blower or air moving means 160 is supported upon the door 16' of the lamp structure for establishing or creating an air stream for circulation adjacent the reflector. Secured to the door 16' is a blower casing 161 which contains a rotatable impeller or fan 162 mounted upon a shaft 163 which is journalled in suitable bearings (not shown) carried by the side walls of the housing or casing 161. A motor 165 supported by the impeller casing 161 drives the impeller through the shaft 163.

The housing or casing 161 has a generally tangentially arranged, rectangularly shaped portion 167 providing an air outlet, the portion 167 having a flange 169. A tubular fitting 170 is mounted in an opening formed in the wall of the door 16'. The flange 169 and the fitting 170 are secured to the door 16' by means of bolts 175 or other suitable securing means.

The fitting 170 is of rectangular configuration and the passage therein registers with the passage or outlet formed by member 167 whereby an air stream developed or establishd by rotation of the impeller 162 is conveyed to the interior of the door structure 16'. The wall of the fan or impeller housing 161 opposite the motor 165 is provided with a central opening to admit air into the blower casing 161.

Part of the air of the stream propelled into the enclosure defined by the door 16' flows along the upper rear surface zone of the reflector 105' and part of the air flows downwardly adjacent the rear surface of the reflector and around the lower portion of the reflector, thence upwardly across the frontal face of the reflector. The air caused to flow upwardly ambient the rear upper zone of the reflector, and the air moving downwardly around the lower edge of the reflector and upwardly over the face thereof, is conducted or exhausted from the lamp housing 10' through a chimney or vent of the character shown at 12 in Figure 1.

The circulating air provided by the blower or fan construction mounted upon the door 16' may if desired, be supplemented by air from the reservoir 35' formed in the base of the lamp, the air being projected therefrom through passages formed in fittings 146', the walls of the fittings being arranged to project the air from the chamber 35' into contact with the reflector in the manner hereinbefore described in connection with the lamp construction shown in Figure 1.

The air stream provided by the blower 160 provides facile means of establishing a circulating cooling fluid ambient the reflector and wherein some air projected into the door construction 16' passes around the lower edge of the reflector and upwardly across the light reflecting area to assist in purging the reflecting surface of particles of ash formed by oxidation of the electrodes.

Through the arrangement of mounting the fan or blower construction directly upon the hinged door 16', easy access to the interior of the lamp housing is afforded without any disruption or removal of the blower or fan construction. The arrangement of mounting or affixing the blower construction to the door of an arc lamp structure renders possible the incorporation of the blower construction in lamps of various types without modification or change in design of the lamps.

Figures 8 through 12 inclusive illustrate an arc lamp construction embodying a modified arrangement for circulating an air stream ambient the upper zone of the frontal surface of a reflector. The arc lamp is particularly illustrated in Figure 8 and includes a sheet metal housing 190 having a frontal cover or plate 192 provided with an opening through which the light beam is projected. The housing 190 is formed with a rear plate or cover member 193, the members 192 and 193 being held together and to the housing by means of bolts 194 and securing nuts 195. The rear housing plate 193 is equipped with a door 197 which may be hingedly connected with the plate 193 by a hinge construction 198 arranged at one side of the door as shown in Figure 9.

The housing 190 encloses a positive electrode 200, a negative electrode 202, and means for supporting the electrodes for advancing the electrodes to compensate for the oxidation thereof. The positive electrode 200 is supported by a carrier (not shown) supplemented by a guide means 205 mounted upon a bracket 207 which is fixedly connected with a driving chain 210. The carriage supporting the positive electrode is connected to and adapted to be driven by the chain 210. Disposed within the space defined by the rear plate 193 and the door 197 is a motor 212 supported by suitable means (not shown).

The motor shaft 214 is provided with a worm 216 which meshes with a worm wheel 218 mounted upon a vertically disposed shaft 220. The shaft 220 through the medium of worm and gear mechanism and a shaft 224 drives a shaft 226 equipped with a sprocket for causing movement of the chain 210. The upper flight of the chain 210 carrying the bracket 207 and the carriage for the positive electrode is movable in a lefthand direction as viewed in Figure 8 to advance the positive electrode 200 in the direction of the arc as oxidation consumes the carbon or electrode 200.

The negative electrode 202 is supported by a holder 230. The vertical shaft 220 is provided with a gear 232 driving a gear train which operates a conventional toothed wheel and pawl mechanism (not shown) for intermittently actuating the electrode holder 230 to advance the electrode 202.

Mounted in the housing 190 is a vertically disposed frame plate or member 236. The member 236 supports a supplemental frame 238 upon which is mounted a reflector 240 of ellipsoidal or other light condensing shape. The reflector 240 is disposed so as to project or reflect the beam of light from the arc through the aperture in the frontal plate 192.

Secured to the member 236 is a blower housing or casing 244. Disposed within the housing is a fan or impeller 246 which is supported upon a portion of shaft 214 extending into the casing 244. The fan or impeller 246 is held in place on the shaft by means of a screw 247.

The housing 244 and impeller 246 form a blower or air moving means for establishing a stream of air directed across the upper frontal or reflecting surface of the reflector.

The blower housing 244 is of generally involute shape providing an air passage 248. The housing is provided with an extension or projection 250 which is formed with a rectangular passage. Extending into the rectangular passage is an upwardly extending portion 252 of a sheet metal fitting 254, the fitting having passage 256 which registers with the rectangular opening in the projection 250 of the fan housing.

The fitting 254 extends through a central opening 258 formed in the reflector 240. The portion of the fitting 254 extending forwardly of the reflector is provided with an upwardly extending wall or baffle 260. The fitting 254 is formed with an outlet passage or orifice 262 through which a stream of air developed by rotation of the impeller is projected upwardly along the frontal or light reflecting surface of the reflector 240. The baffle or wall 260 is arranged to guide or influence the air from the blower to flow along the surface of the reflector. The housing 244 has one side wall formed with a central opening 266 through which air is drawn into the impeller housing for discharge through the passages 248, 256 and 262. The door 197 is provided with louvers or vents 270 through which air is admitted into the rear zone of the lamp structure in order that an ample supply of air at room temperature is had for the blower means.

The opening 266 is in a wall of the casing 244 adjacent the rear of the reflector. Hence during rotation of the impeller 246, air is drawn into the casing 244 from the zone adjacent the rear upper portion of the reflector and effects some cooling of the reflector.

The air discharged from the blower through the orifice 262 flows upwardly along the frontal face or reflecting surface at the upper zone of the reflector and purges this zone of ash or oxidized particle resulting from the oxidization or a burning away of the electrodes. The moving air stream at the frontal surface of the reflector entrains the particles of ash and carries them upwardly for discharge through the chimney or vent opening 275 formed at the upper portion of the housing 190. This air stream also tends to remove any particles adhering to the upper zone of the reflecting surface and effectively cools or reduces the temperature of the upper zone of the reflector.

Through this arrangement a circulation of air is established ambient the upper zone of the reflector to cool this zone of the reflector and reduce the temperature differential between the upper and lower zone of the reflector, thus reducing the liability of breakage of the reflector due to unequal expansion and contraction.

It is apparent that, within the scope of the invention, modifications and different arrangements may be made other than is herein disclosed, and the present disclosure is illustrative merely, the invention comprehending all variations thereof.

I claim:

1. In combination, an arc lamp having a housing, a pair of electrodes in said housing disposed to produce an arc, a reflector arranged to project light from the arc, means for advancing the electrodes to compensate for the burning of the electrodes to maintain the arc in a predetermined position relative to the reflector, a vent for the housing, means establishing an air stream arranged to flow upwardly and across the central vertical zone of and in substantial parallelism with the reflecting surface of the reflector for conveying heat produced by the arc away from the zone of the reflector and into the vent.

2. In combination, an arc lamp having a housing, a pair of electrodes in said housing disposed to produce an arc, a reflector arranged to project light from the arc, means for advancing the electrodes to compensate for the burning of the electrodes to maintain the arc in a predetermined position relative to the reflector, a vent for the housing, means including a blower establishing an air stream arranged to flow upwardly and across the central vertical zone of and in substantial parallelism with the front surface of the reflector for conveying heat and oxidized particles resulting from burning of the electrodes away from the central zone of the reflector and through the vent without impairing the characteristics of the arc.

3. In combination, an arc lamp having a housing, a pair of electrodes in said housing disposed to produce an arc, a reflector arranged to project light from the arc, means for advancing the electrodes to compensate for the burning of the electrodes to maintain the arc in a predetermined position relative to the reflector, means establishing an air stream arranged to flow along and in substantial parallelism with the reflecting surface of the reflector for conveying heat produced by the arc and products of combustion resulting from burning of the electrodes away from the zone of the reflector without impairing the character of the arc.

4. In combination, an arc lamp including a housing, a pair of electrodes in said housing disposed to produce an arc by the passage of electric current therebetween, a reflector arranged to project light from the arc, means for advancing the electrodes to compensate for oxidation of the electrodes to maintain the arc in a predetermined position relative to the reflector, a blower disposed in the housing and rearwardly of the reflector for establishing an air stream, said air stream being directed into contact with a central vertical region of the reflecting surface of the reflector for conveying away heat and products of oxidation of the electrodes without impairing the quality of the arc.

5. In combination, an arc lamp including a housing, a pair of electrodes in said housing disposed to produce an arc by the passage of electric current therebetween, a reflector arranged to project light from the arc and having a central opening formed therein, means for advancing the electrodes to compensate for combustion of the electrodes to maintain the arc in a predetermined position relative to the reflector, a blower disposed rearwardly of the reflector for establishing an air stream, means extending through the opening in the reflector for directing the air stream along the vertical central region of the reflecting surface of the reflector for conveying away heat and products of the electrodes without impairing the quality of the arc.

6. In combination, an arc lamp including a housing, a pair of electrodes in said housing disposed to produce an arc by the passage of electric current therebetween, a reflector arranged to project light from the arc, means for advancing the electrodes to compensate for oxidation of the electrodes to maintain the arc in a predetermined position relative to the reflector, a relatively movable door carried by the housing, a blower associated with the door for establishing an air stream, said air stream being directed into contact with the vertical central region of the reflector for cooling the reflector.

7. In combination, an arc lamp including a housing, a pair of electrodes in said housing disposed to produce an arc by the passage of electric current therebetween, a reflector arranged to project light from the arc, means for advancing the electrodes to compensate for oxidation of the electrodes to maintain the arc in a predetermined position relative to the reflector, a movable door hingedly supported on the housing, and blower means mounted on the door establishing an air stream adjacent the reflector to entrain and convey heat and products of oxidation from the electrodes away from the zone of the reflector.

8. In combination, an arc lamp including a housing, a pair of electrodes in said housing disposed to produce an arc by the passage of electric current therebetween, a reflector arranged to project light from the arc, means for advancing the electrodes to compensate for oxidation of the electrodes to maintain the arc in a predetermined position relative to the reflector, a relatively movable door for the housing, and blower means carried by the door exteriorly thereof establishing an air stream directed into the housing and adjacent the reflector to entrain and convey heat produced by the arc away from the zone of the reflector without affecting the quality of the arc.

9. In combination, an arc lamp including a housing, a pair of electrodes in said housing disposed to produce an arc by the passage of electric current therebetween, a reflector arranged to project light from the arc, means for advancing the electrodes to compensate for combustion of the electrodes to maintain the arc in a predetermined position relative to the reflector, an air reservoir associated with the housing, means for establishing air pressure above atmospheric pressure in said reservoir, a nozzle connected with said reservoir, said nozzle being arranged to direct a stream of air from the reservoir onto the reflecting surface for cooling the reflector and purging the surface of the reflector of products of combustion from the electrodes.

10. In combination, an arc lamp including a housing, a pair of electrodes in said housing disposed to produce an arc by the passage of electric current therebetween, a reflector arranged to project light from the arc, means for advancing the electrodes to compensate for combustion of the electrodes to maintain the arc in a predetermined position relative to the reflector, an air reservoir associated with the housing, means for establishing air pressure above atmospheric pressure in said reservoir, a wall of said reservoir being disposed adjacent said reflector, said wall being formed with an opening arranged to direct a stream of air from the reservoir onto the reflecting surface for cooling the reflector and purging the surface of the reflector of products of combustion from the electrodes.

11. In combination, an arc lamp including a housing having a vent in its upper portion, a pair of electrodes in said housing disposed to produce an arc by the passage of electric current therebetween, a reflector arranged to project light from the arc, means for advancing the electrodes to compensate for combustion of the electrodes to maintain the arc in a predetermined position relative to the reflector, an air reservoir formed in the base of the housing, means for establishing air pressure above atmospheric pressure in said reservoir, a wall of said reservoir being disposed adjacent said reflector, a plurality of orifice members in communication with the reservoir arranged to direct streams of air from the reservoir onto the reflecting surface of the reflector for reducing the temperature of the reflector and purging the reflecting surface of products of combustion from the electrodes.

12. In combination, an arc lamp including a housing having a vent in its upper portion, a pair of electrodes in said housing disposed to produce an arc by the passage of electric current therebetween, a reflector arranged to project light from the arc, means for advancing the electrodes to compensate for combustion of the electrodes to maintain the arc in a predetermined position relative to the reflector, an air reservoir associated with the base of the housing, a plurality of the blowers for establishing air pressure above atmospheric pressure in said reservoir, a plurality of orifice members in communication with the reservoir arranged to direct streams of air from the reservoir onto a surface of the reflector for cooling the reflector and entraining and conveying away products of combustion from the electrodes, said vent in the housing being arranged to exhaust the heated air and products of combustion from the housing without impairing the quality of the arc.

References Cited in the file of this patent

UNITED STATES PATENTS

| | | |
|---|---|---|
| 1,318,701 | Sperry | Oct. 14, 1919 |
| 1,714,242 | Del Riccio | May 21, 1929 |
| 2,510,102 | Gretener | June 6, 1950 |
| 2,681,983 | Witte | June 22, 1954 |